US010886571B2

(12) United States Patent
Schwab et al.

(10) Patent No.: US 10,886,571 B2
(45) Date of Patent: Jan. 5, 2021

(54) MODIFICATION OF TRUCK MIXING ELEMENT FOR MANUAL AND AUTOMATIC ASSEMBLY

(71) Applicant: Johnson Controls Autobatterie GmbH & Co. KGAA, Hannover (DE)

(72) Inventors: Julius M. Schwab, Hannover (DE); Ingo Koch, Hameln (DE); Nadine Dehnert, Seelze (DE); Thorsten Werle, Burgdorf (DE)

(73) Assignee: Clarios Germany GmbH & Co. KGAA, Hannover (DE)

( * ) Notice: Subject to any disclaimer, the term of this patent is extended or adjusted under 35 U.S.C. 154(b) by 795 days.

(21) Appl. No.: 15/036,974

(22) PCT Filed: Nov. 4, 2014

(86) PCT No.: PCT/EP2014/073661
§ 371 (c)(1),
(2) Date: May 16, 2016

(87) PCT Pub. No.: WO2015/110192
PCT Pub. Date: Jul. 30, 2015

(65) Prior Publication Data
US 2016/0294020 A1    Oct. 6, 2016

(30) Foreign Application Priority Data
Jan. 24, 2014    (DE) .................. 10 2014 100 806

(51) Int. Cl.
*H01M 10/42*    (2006.01)
*H01M 2/38*    (2006.01)
(Continued)

(52) U.S. Cl.
CPC ....... *H01M 10/4214* (2013.01); *H01M 2/024* (2013.01); *H01M 2/0237* (2013.01);
(Continued)

(58) Field of Classification Search
CPC ................. H01M 2/38; H01M 2/385
(Continued)

(56) References Cited

U.S. PATENT DOCUMENTS 529,199 A    11/1894    Schoop et al.
916,320 A    3/1909    Joel
(Continued)

FOREIGN PATENT DOCUMENTS

CN    101308922 A    11/2008
CN    101379634 A    3/2009
(Continued)

OTHER PUBLICATIONS

International Search Report & Written Opinion dated Apr. 26, 2011, International Appln. No. PCT/US2010/047869 filed Sep. 3, 2010.
(Continued)

*Primary Examiner* — Robert S Carrico
(74) *Attorney, Agent, or Firm* — Boardman & Clark LLP

(57) ABSTRACT

The invention relates to a mixing element designed to be installed into a housing of a liquid electrolyte-operated electrochemical accumulator in order to mix the electrolyte as a result of forces and/or motion exerted on the accumulator during operation, wherein the mixing element is designed as a hollow body provided with at least one respective opening at opposite end regions such that a channel is formed in the hollow body which leads into the at least one respective opening in the opposite end regions and is circumferentially delimited there by the material of the mixing element, wherein the mixing element comprises one or more securing and/or spacer ribs protruding from the external side of the mixing element and designed to contact parts of the accumulator housing in order to fix the mixing element in the accumulator and/or set a specific position of the mixing element relative to the housing parts. The inven- (Continued)

Figure 3:
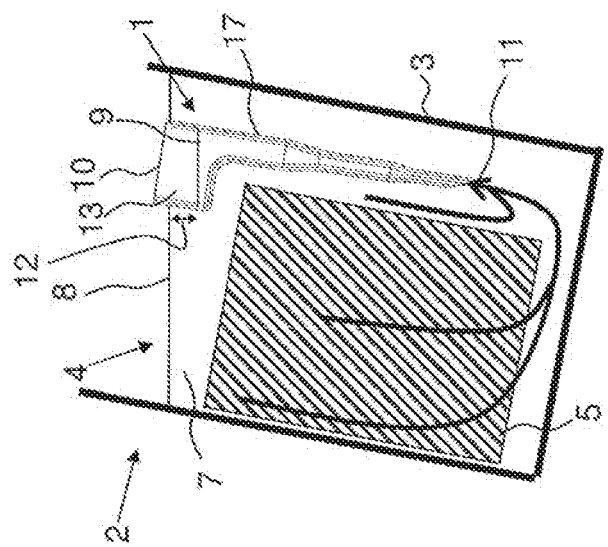

tion further relates to a range of mixing elements as well as an accumulator having at least one mixing element.

12 Claims, 9 Drawing Sheets

(51) Int. Cl.
    *H01M 2/02*    (2006.01)
    *H01M 10/12*    (2006.01)

(52) U.S. Cl.
    CPC ............. *H01M 2/38* (2013.01); *H01M 10/12* (2013.01); *H01M 2/0242* (2013.01); *H01M 2220/20* (2013.01)

(58) Field of Classification Search
    USPC .......................................................... 429/81
    See application file for complete search history.

(56) References Cited

U.S. PATENT DOCUMENTS

| | | | |
|---|---|---|---|
| 2,584,117 A | 2/1952 | Elrod et al. | |
| 4,283,467 A | 8/1981 | Guetlich et al. | |
| 4,308,322 A | 12/1981 | Hammar | |
| 4,619,875 A | 10/1986 | Stahura et al. | |
| 4,945,011 A | 7/1990 | Tanaka | |
| 4,963,444 A | 10/1990 | Delaney | |
| 5,032,476 A * | 7/1991 | Kirby ..................... | H01M 2/38 429/67 |
| 5,096,787 A | 3/1992 | Delaney et al. | |
| 5,879,831 A | 3/1999 | Ovschinsky et al. | |
| 6,475,665 B1 | 11/2002 | Okamoto et al. | |
| 6,821,669 B2 | 11/2004 | Tschirch | |
| 2002/0028373 A1 | 3/2002 | Tschirch et al. | |
| 2007/0009790 A1 | 1/2007 | Vutetakis | |
| 2011/0314663 A1 | 12/2011 | Bauer et al. | |
| 2012/0015240 A1 * | 1/2012 | Baek ..................... | H01M 2/021 429/178 |
| 2012/0214032 A1 | 8/2012 | Franklin et al. | |
| 2013/0202949 A1 | 8/2013 | Bremer et al. | |
| 2013/0288090 A1 * | 10/2013 | Lee ......................... | H01M 2/38 429/81 |
| 2016/0294020 A1 | 10/2016 | Schwab et al. | |

FOREIGN PATENT DOCUMENTS

| | | |
|---|---|---|
| CN | 102640326 A | 8/2012 |
| CN | 103299450 A | 9/2013 |
| DE | 9115597 U1 | 4/1993 |
| DE | 102006021576 B3 | 9/2007 |
| DE | 102006021585 B3 | 9/2007 |
| JP | H05-001160 U | 1/1993 |
| JP | 2006-240382 A | 9/2006 |
| JP | 2011-151929 A | 8/2011 |
| WO | 89/12325 A1 | 12/1989 |
| WO | 89/12326 A1 | 12/1989 |
| WO | 2008019676 A2 | 2/2008 |
| WO | 2009077022 A1 | 6/2009 |
| WO | 2012048885 A1 | 4/2012 |

OTHER PUBLICATIONS

International Preliminary Report on Patentability dated Mar. 6, 2012, International Appln. No. PCT/US2010/047869 filed Sep. 3, 2010.
International Preliminary Report on Patentability dated Apr. 25, 2013, International Appln. No. PCT/EP2011/005162 filed Oct. 14, 2011 (English translation).
International Search Report & Written Opinion of the International Searching Authority dated Apr. 19, 2012, International Appln. No. PCT/EP2011/005162 filed Oct. 14, 2011 (English translation).
International Search Report (English Translation) and Written Opinion of the International Searching Authority dated Feb. 5, 2015, for PCT/EP2014/073661 filed Nov. 4, 2014, 16 pages.

* cited by examiner

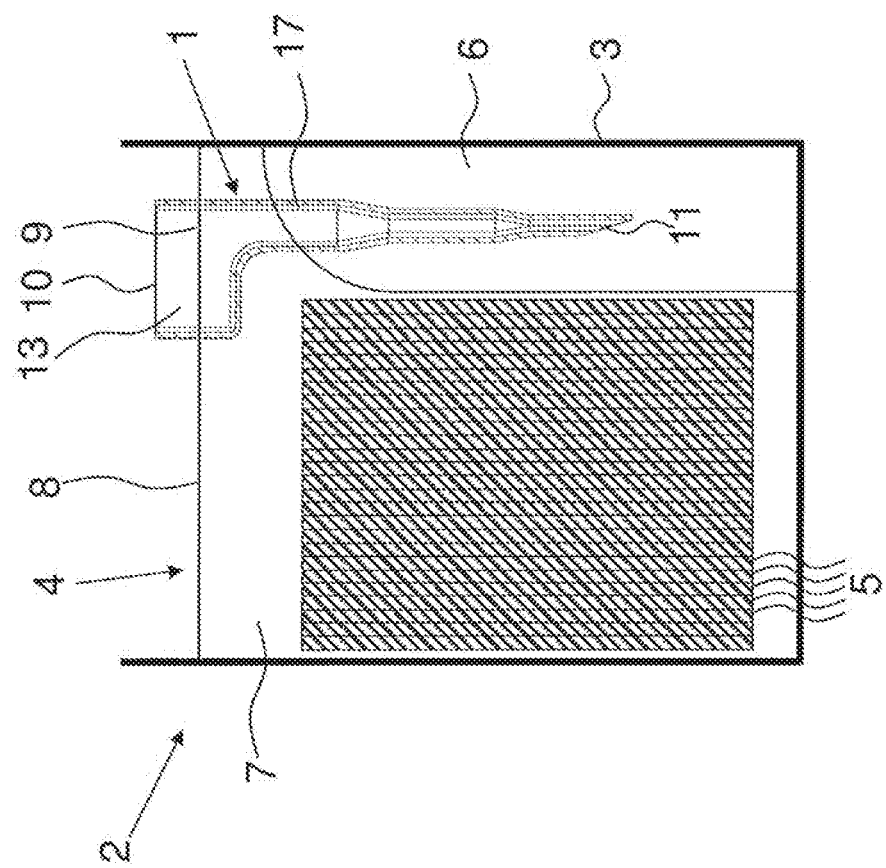

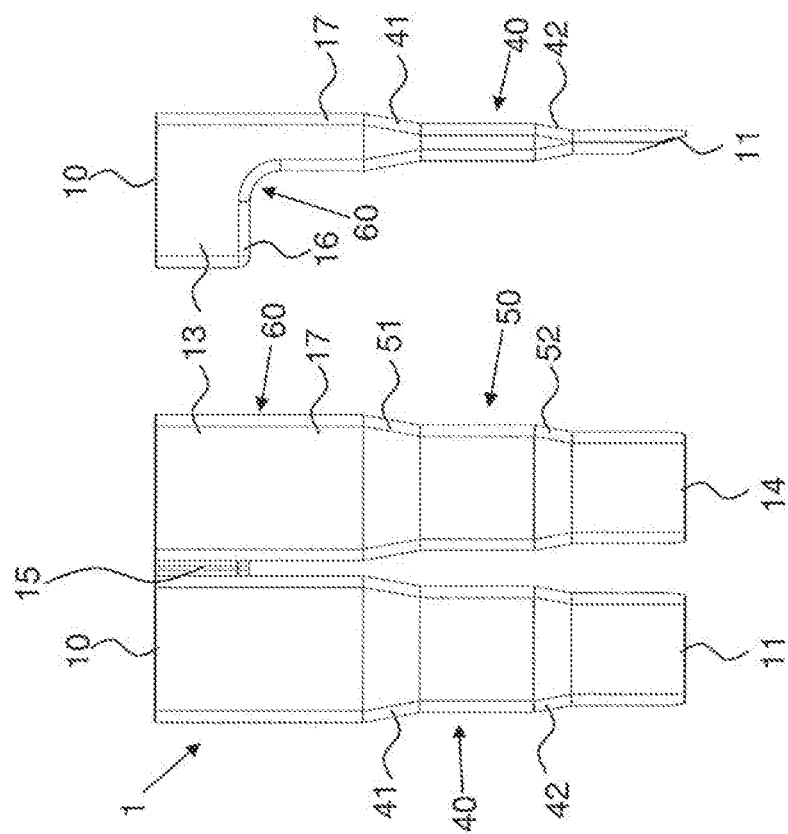
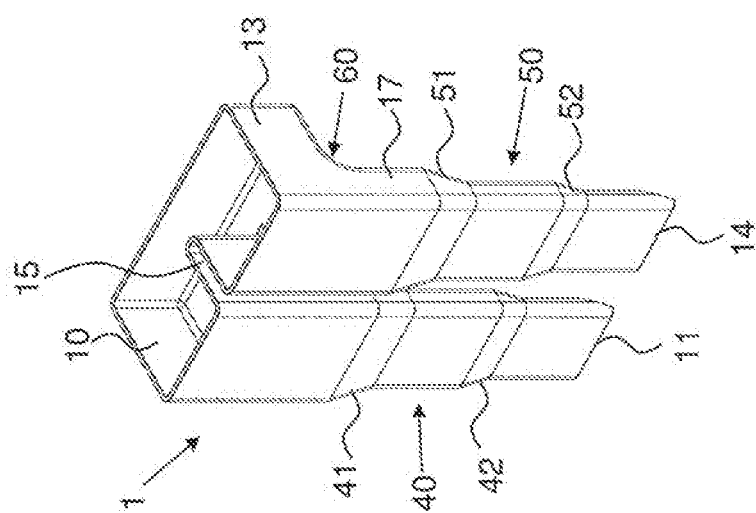

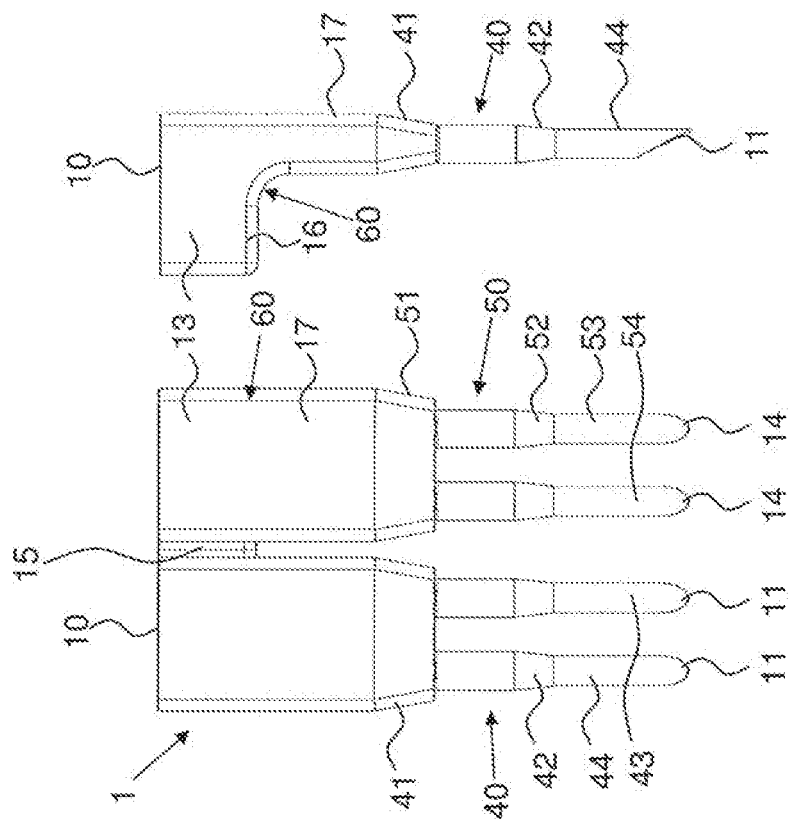
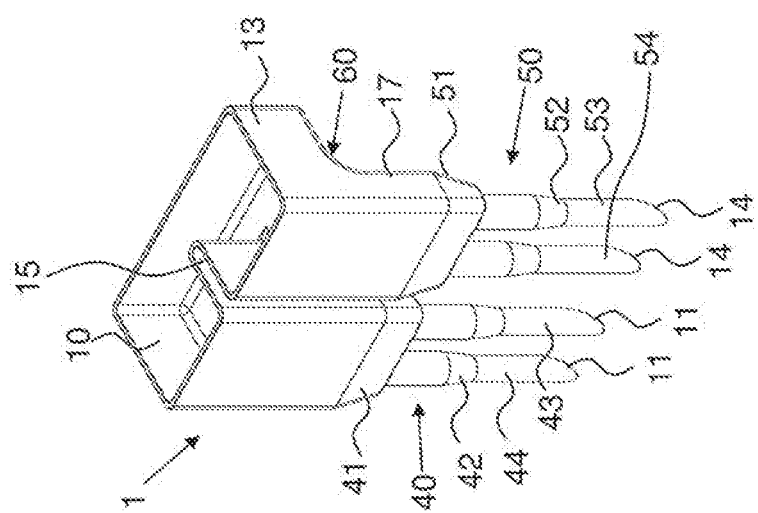

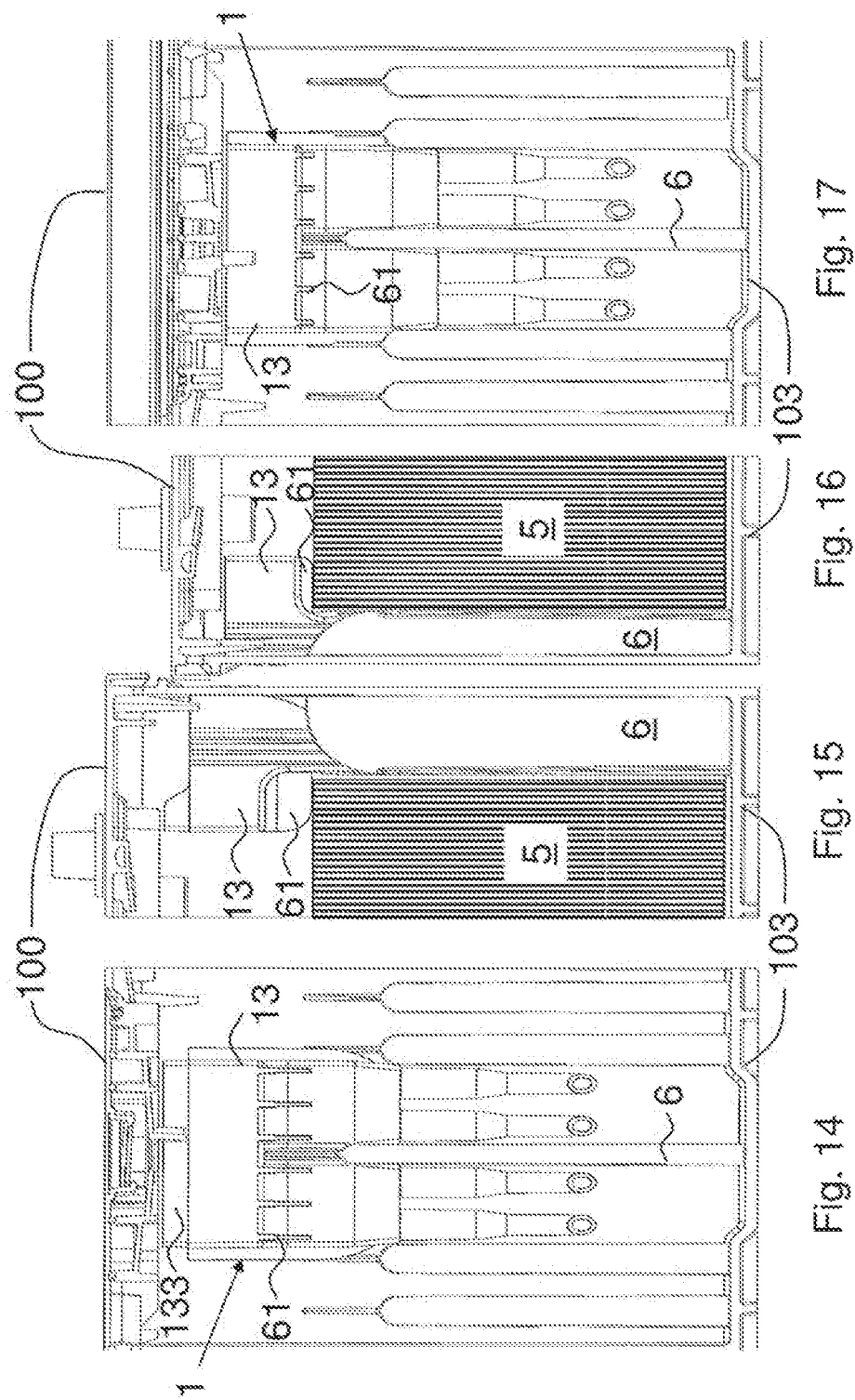

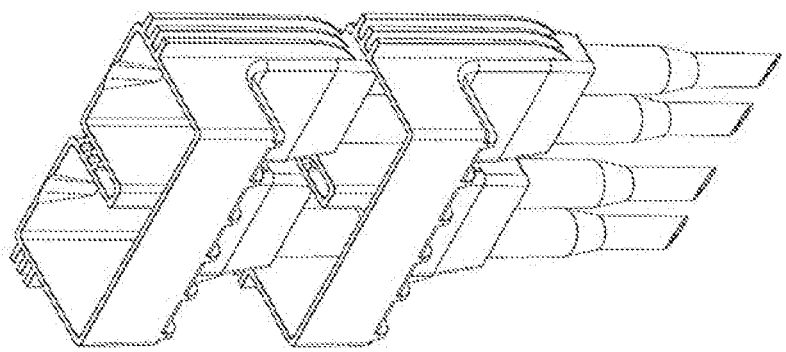
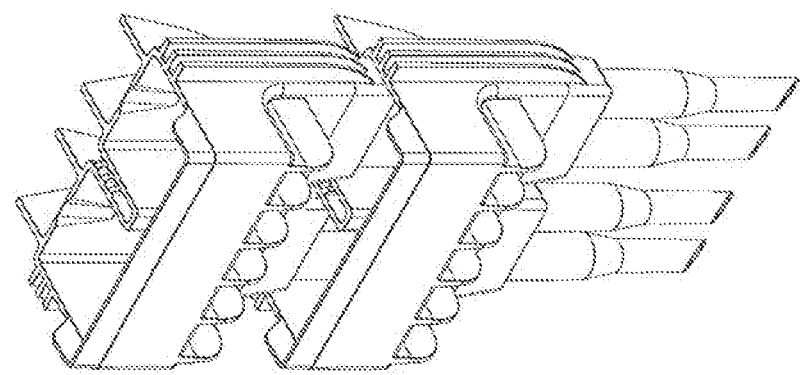
Fig. 19

MODIFICATION OF TRUCK MIXING ELEMENT FOR MANUAL AND AUTOMATIC ASSEMBLY

The invention relates to a mixing element designed to be installed into a housing of a liquid electrolyte-operated electrochemical accumulator in accordance with claim 1. The invention further relates to a range of mixing elements in accordance with claim 11 as well as an accumulator comprising at least one mixing element in accordance with claim 12.

In general terms, the invention relates to the field of liquid electrolyte-operated accumulators; i.e. rechargeable electrochemical batteries, for example in the form of lead-acid batteries. Such accumulators are used for example as starter batteries for motor vehicles. Mixing elements of the generic type are known for example from WO 2011/029035 A2 and DE 10 2010 048 428 A1.

The invention is based on the task of specifying a universally applicable mixing element for an electrochemical accumulator. A range of mixing elements applicable to different types of accumulators as well as an accumulator having such a mixing element are further to be specified.

The task is solved according to claim 1 by a mixing element which is designed to be installed in a housing of an electrochemical accumulator operated by liquid electrolyte in order to mix the electrolyte as a result of forces and/or motion exerted on the accumulator during operation, whereby the mixing element is designed as a hollow body provided with at least one respective opening at opposite end regions such that a channel is formed in the hollow body which leads into the at least one respective opening at the opposite end regions and is circumferentially delimited there by the material of the mixing element, wherein the mixing element comprises one or more securing and/or spacer ribs protruding from the external side of the mixing element and designed to contact parts of the accumulator housing in order to fix the mixing element in the accumulator and/or set a specific position of the mixing element relative to the housing parts.

Insofar as the terms "above" and "below" are used, these indications refer to the position of the accumulator when operated in specification-compliant use; i.e. a substantially horizontal position in which the cover of the accumulator as well as its filler openings for the liquid electrolyte are situated at the top. A certain deviation from the horizontal position is permissible upon normal specification-compliant motion load on the accumulator such as occurs for example when the accumulator is operated in a motor vehicle. Operating positions which are not specification-compliant are for example positions rotated 90° or 180° relative to the horizontal position.

The invention has the advantage of the inventive mixing element being able to be universally applicable with respect to all possible types, sizes and designs of electrochemical accumulators due to the externally arranged securing and/or spacer ribs protruding from the external side of the mixing element. The securing and/or spacer ribs facilitate the securing of the mixing element in a cell chamber of the accumulator. Insertion of the mixing element into the cell chamber is also facilitated. Moreover, the securing and/or spacer ribs can ensure a defined positioning, making installation a quick and easy process even for less experienced personnel. The improved design of the mixing element with the securing and/or spacer ribs is also advantageous to automated accumulator production. It is thereby unnecessary for the entire mixing element as a whole to be structurally modified for different types, sizes and designs of accumulators, but rather only the dimensions of one or more of the external securing and/or spacer ribs. The proportions of the mixing element which are essential to the mixing function remain the same such that there is also no change in the mixing element's performance and effectiveness. The central functional body of the mixing element can thus be of uniform design and realization such that it can be consistently used and installed in differently sized accumulators having diverse retaining rib variations. In particular, the mixing element can be installed into the housing of the accumulator without any material bonding procedure, e.g. by clamping via one, some or all of the securing and/or spacer ribs.

According to one advantageous further development of the invention, the mixing element is designed to be stackable with other mixing elements. To this end, the geometrical shape of the mixing element is configured such that it can be at least partly set into another mixing element and thus multiple mixing elements can be stacked one inside the other. This stackability reduces the space required to store the mixing elements and enables better handling during automated assembly of accumulators.

One advantageous further development of the invention provides for the mixing element to have a volumetric space in the area of an upper end region designed to be arranged above an oppositely disposed lower end region when installed in the housing, the circumference of which is significantly larger than the circumference of the mixing element sections below it so that the mixing element sections underneath form at least one thin flow channel compared to the cross-sectional area of the volumetric body. This has the advantage of further improving the inventive mixing element's desirable electrolyte mixing. Acid stratification in the accumulator can thereby be eliminated or at least significantly reduced. Acid stratification refers to different acid densities over the height of the accumulator. The mixing element according to the invention enables electrolyte mixing at a higher functional effectiveness as a result of the reduced circumference and the thereby associated decreased flow area of the hollow body in the area of the thin flow channel. The mixing element according to the invention already provides comparable mixing effects to prior art mixing elements even at lower motion loads on the accumulator.

The mixing element can be made for example from polypropylene or another suitable flexible and acid-proof material.

As regards its height, i.e. its longitudinal extension in the vertical direction when in the intended installed position in the accumulator, the mixing element according to the invention can be designed so as to yield a cyclic circulation of electrolyte upon motion loads on the accumulator such that electrolyte spills over the upper edge of the mixing element and drains again via the lower opening as described for example in U.S. Pat. No. 5,096,787. In this case, the mixing element has the function of a hydrostatic pump.

According to one advantageous further development of the invention, the mixing element extends at least as far upward so as to prevent liquid electrolyte from overflowing over the upper edge region of the mixing element upon specification-compliant motion load on the accumulator such as occurs in a moving vehicle. So doing enables being able to advantageously realize the principle of communicating vessels. A communicating connection forces a back-and-forth motion of electrolyte in the lower region of the mixing element between the volumetric space of the mixing element and the surrounding cell chamber of the accumulator; i.e. by way of the lower opening, and not an electrolyte circulation as with the hydrostatic pump principle. This has the advantage of the sludge which has accumulated on the bottom of the accumulator remaining in place since there is no circulation of electrolyte. The electrolyte motion thereby compelled is sufficient enough to mix the electrolyte to the extent of eliminating or at least greatly reducing acid stratification.

The communicating connection in the lower region of the mixing element; i.e. the lower opening through which the liquid electrolyte can flow, can exhibit a number of different configurations, e.g. in the form of a gap or in the form of one or more openings in the lower region of the mixing element. The above-cited openings can be arranged at different positions on the mixing element, preferably of course in the lower area of the flow channel.

According to one advantageous further development of the invention, the mixing element is manufactured as a separate component which is not set into the accumulator housing until the accumulator is assembled. The mixing element can be configured for example as a component insertable into a cell chamber of the accumulator. This has the advantage of the mixing element being able to be manufactured separately and inserted as needed into the cell chamber of the accumulator. Accumulators can thus be economically manufactured both with the mixing element as well as without the mixing element without the need for different injection molds to produce the housing parts of the two versions of the accumulator, as would be necessary with an integrally formed wall element. Additionally, accumulators manufactured in previous series production runs can also be easily converted to accumulators having integrated mixing in the form of a mixing element; i.e. without high expenditures for manufacturing equipment.

The mixing element can in particular have the form of a ring-shaped hollow body, whereby ring shape in this case does not refer exclusively to an annular shape but also any other circular ring form. The mixing element can be for example formed as, with the exception of the openings provided in the oppositely disposed end regions, a substantially closed hollow body. This enables the mixing element to be easily produced, e.g. from a plastic material.

The mixing element can be advantageously manufactured with an internal mandrel and an external form, for example by injection molding. The mixing element can also be manufactured as a hollow body via a blow process or deep-drawing process. In conjunction hereto, the thin flow channel tapering toward the lower end region with respect to circumference has the further advantage of improving the demoldability of the mixing element during the manufacturing process.

According to one advantageous further development, the circumference in the area of the thin flow channel decreases discontinuously over the longitudinal extension of the mixing element by means of one or more discontinuities. This results in a type of incremental decrease to the hollow body circumference. Doing so can further improve the mixing element's functional effectiveness in terms of the liquid electrolyte mixing effect. Providing one or more discontinuities over the course of the flow channel results in one or more graduated transitions of the flow resistance and thus a deceleration or acceleration in the electrolyte exchange between the volumetric space of the mixing element and the interior of the accumulator. It is for example advantageous for two or three such discontinuities to be provided in the region of the thin flow channel. The discontinuities also further improve the demoldability of the mixing element during the manufacturing process.

According to one advantageous further development of the invention, one or more discontinuities extend linearly over the longitudinal extension of the mixing element; i.e. depending on the embodiment, the circumferential decrease or cross-sectional reduction in these areas is linear. This enables simple and economical manufacture of the mixing element as well as improves the mechanical stability of the thin flow channel.

According to one advantageous further development of the invention, the mixing element comprises at least two separated thin flow channels connected to the common volumetric space. One, multiple or all of the separated thin flow channels can be configured in accordance with the above-cited features of the thin flow channel, particularly with one or more discontinuities.

According to one advantageous further development of the invention, the mixing element comprises an indentation on at least one side of the hollow body which runs in the longitudinal direction of the mixing element and is designed to receive an accumulator housing rib. This allows simple and reliable mechanical securing of the mixing element in the accumulator housing, provided same is configured with internal housing ribs. In this case, no additional mechanical securing means are necessary. The indentation can in particular be provided in the region of the volumetric space or respectively extend into this space such that the volumetric space is divided.

According to one advantageous further development of the invention, the indentation is at least as deep as the extension of the thin flow channel in the same direction; i.e. in the direction of extension of the indentation. This enables a particularly sturdy mechanical securing of the mixing element to the housing rib of the accumulator housing. Additionally, at least two separate thin flow channels are thereby created.

According to one advantageous further development of the invention, the mixing element comprises at least one securing and/or spacer rib protruding in the direction of the housing cover of the accumulator housing. Such a securing and/or spacer rib can fix the position of the mixing element relative to the housing cover and also secure the mixing element relative to the housing cover.

According to one advantageous further development of the invention, the mixing element comprises at least one securing and/or spacer rib protruding in the direction of the bottom of the accumulator housing. Said securing and/or spacer rib can for example be arranged on the mixing element at the lower side of the volumetric space. The securing and/or spacer rib protruding in the direction of the bottom of the accumulator housing can ensure a defined downward positioning and securing of the mixing element. Thus, the downward protruding securing and/or spacer rib can rest on the electrodes or the separators encasing the electrodes respectively, thereby defining the mixing element's installation height in the housing.

According to one advantageous further development of the invention, the mixing element comprises one or more outer circumferential securing and/or spacer ribs on one, some or all of its external sides facing the side walls of the accumulator housing. This has the advantage of the mixing element being able to be disposed at a defined horizontal position within a free space of a cell chamber, thereby preventing improper installation in the wrong position. Regarded as the side walls of the accumulator housing are thereby the accumulator's lateral external walls as well as the accumulator housing's internal walls constituting the partition walls between different cell chambers. In the substantially rectangular external cross section when viewed from above, the mixing element can in each case have one or more securing and/or spacer ribs on all four external sides or only on some or only one of the external sides.

According to one advantageous further development of the invention, one or more securing and/or spacer ribs are arranged within the above-described indentation. In particular, one or more securing and/or spacer ribs can be arranged at respective oppositely disposed external sides of the mixing element within the indentation. Such securing and/or spacer ribs arranged within the indentation enable the mixing element to be pressed in wedge-like manner against an inner housing rib of the accumulator housing and secured to said housing rib. To this end, the securing and/or spacer ribs provided within the indentation can exhibit an outer contour which increases in the direction of insertion onto the housing rib so that the outer contour forms a wedge relative to the housing rib.

According to one advantageous further development of the invention, at least two securing and/or spacer ribs are arranged to form a V-shaped pair. This has the advantage of the V-shaped construction being able to prevent a kinking of the spacer ribs when being fit into the housing or during the later actual operation of the accumulator. The securing and/or spacer ribs arranged in V-shaped pairs can thereby join and combine into a V-shaped rib or be arranged at a certain distance from one another.

The initially specified task is solved in accordance with claim 11 by a range of mixing elements of the above-described type, whereby the range comprises mixing elements of varying designs which differ from one another in the arrangement and/or dimensions of the securing and/or spacer ribs. By so doing, respectively suitable mixing elements can be made available for different accumulator types, sizes and designs without any further modifications being needed. The respective mixing element matching the given type of accumulator can thereby be installed without any material bonding procedure and fixed solely by means of clamping the securing and/or spacer ribs to the housing walls and/or housing ribs of the accumulator housing.

The initially specified task is solved in accordance with claim 12 by an accumulator cell having a housing in which at least one accumulator cell is formed, whereby the accumulator cell comprises a plurality of adjacently arranged plated-shaped electrodes within the accumulator cell as well as liquid electrolyte, wherein at least one mixing element of the above-described type is additionally arranged in a free space within the accumulator cell. The inventive accumulator already provides a greater mixing effect at comparatively lower motion load and thereby prevents or at least substantially reduces acid stratification.

According to one advantageous further development of the invention, the mixing element is arranged laterally to a flat side of a plate-shaped electrode in the accumulator cell. The mixing element is hereby not held by the force of the protruding welded ends of the separator pocket as described in DE 10 2010 048 428 A1 since it is disposed at the flat side of the plate-shaped electrode. According to one advantageous further development of the invention, a component integrated into the housing of the accumulator can be provided as the retaining means for mechanically fixing the mixing element in the accumulator cell. In particular, an internal housing rib of the accumulator housing can be used as a retaining means.

The mixing element can be also connected to the housing of the accumulator or the internal housing rib respectively, and thereby positionally fixed, by way of a known bonding process, e.g. plastic welding.

According to one advantageous further development of the invention, the mixing element is arranged between a plate-shaped electrode and the housing wall or an internal housing rib formed on the housing wall.

According to one advantageous further development of the invention, the housing exhibits a longitudinal extension which is the largest dimension of the housing's height, width and length dimensions, and the electrode plates exhibit a longitudinal extension which is the largest dimension of the individual electrode plates' height, width and length dimensions, and the electrode plates are orientationally positioned in a battery cell such that the longitudinal extension of the electrode plates runs substantially in the direction of the housing's longitudinal extension. This allows advantageously accommodating a large number of electrode plates in the housing with good use of the available installation space coupled with a simultaneously advantageous accommodation of one or more mixing elements in the housing.

The following will reference the drawings in describing the invention in greater detail by way of embodiments.

Figure 2:
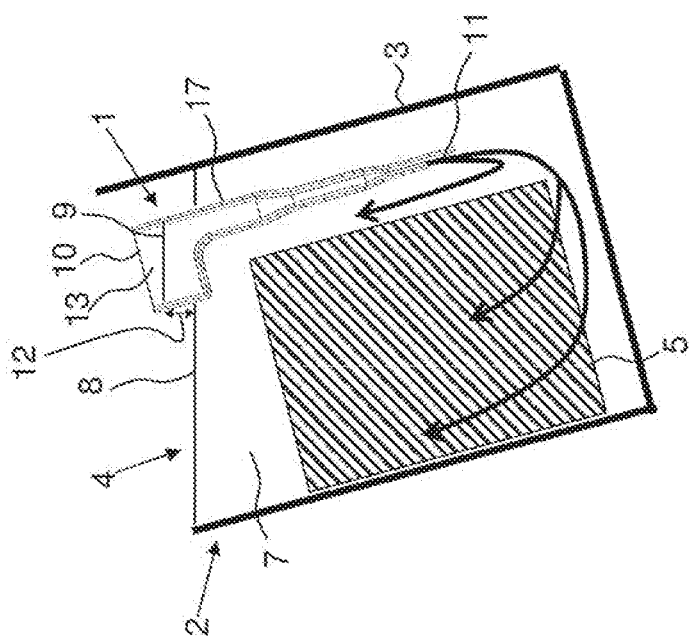
Figure 11:
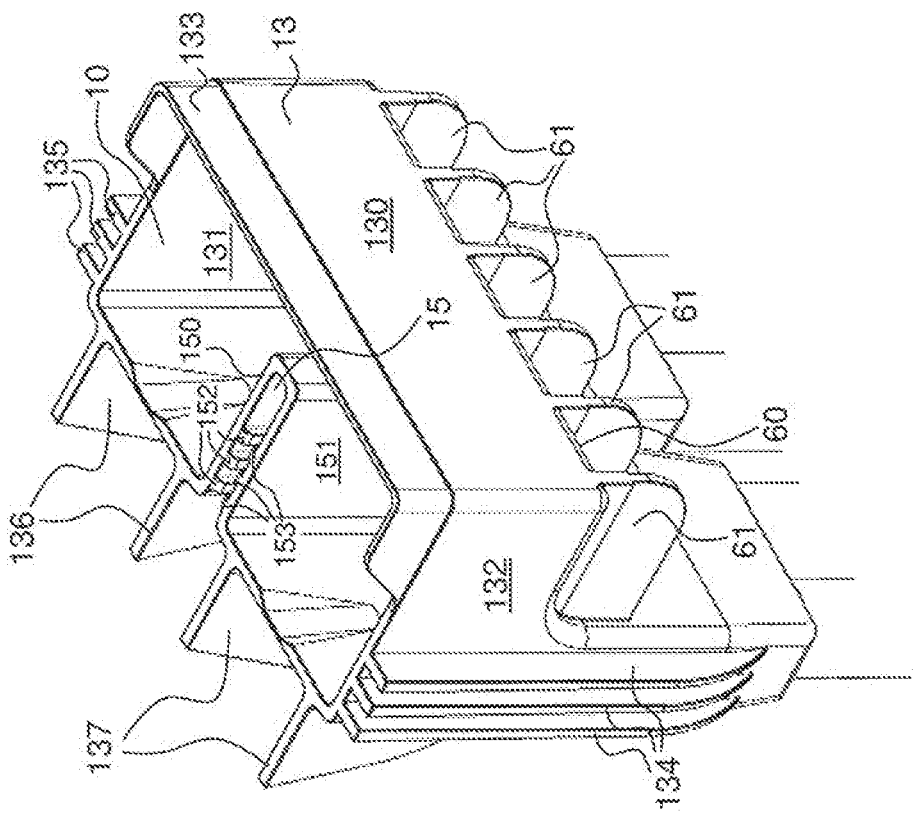
Figure 10:
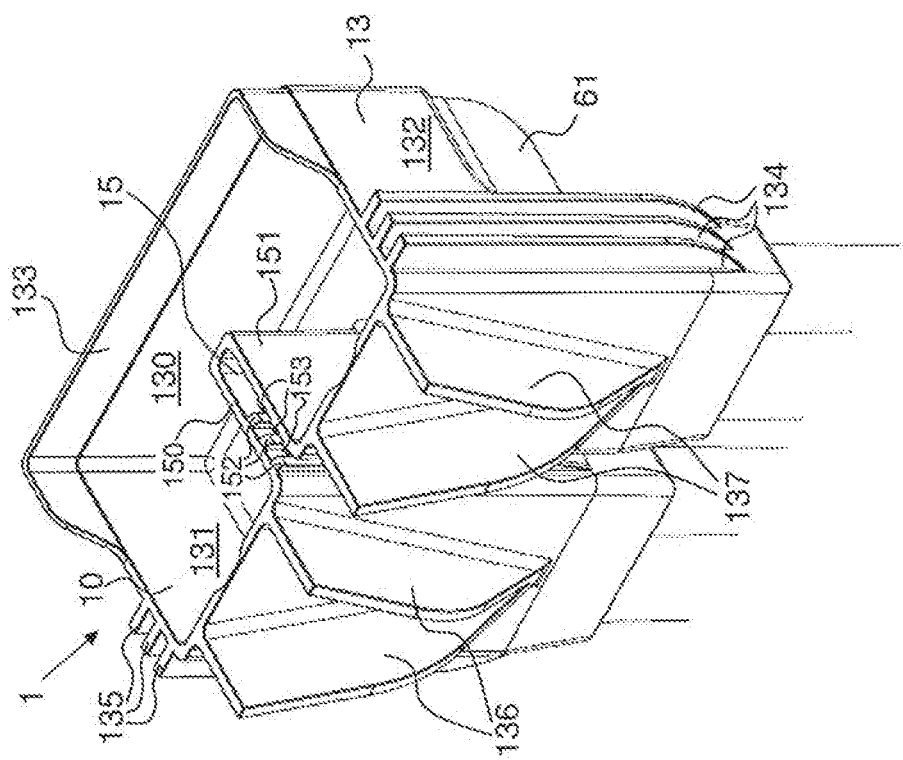
Figure 13:
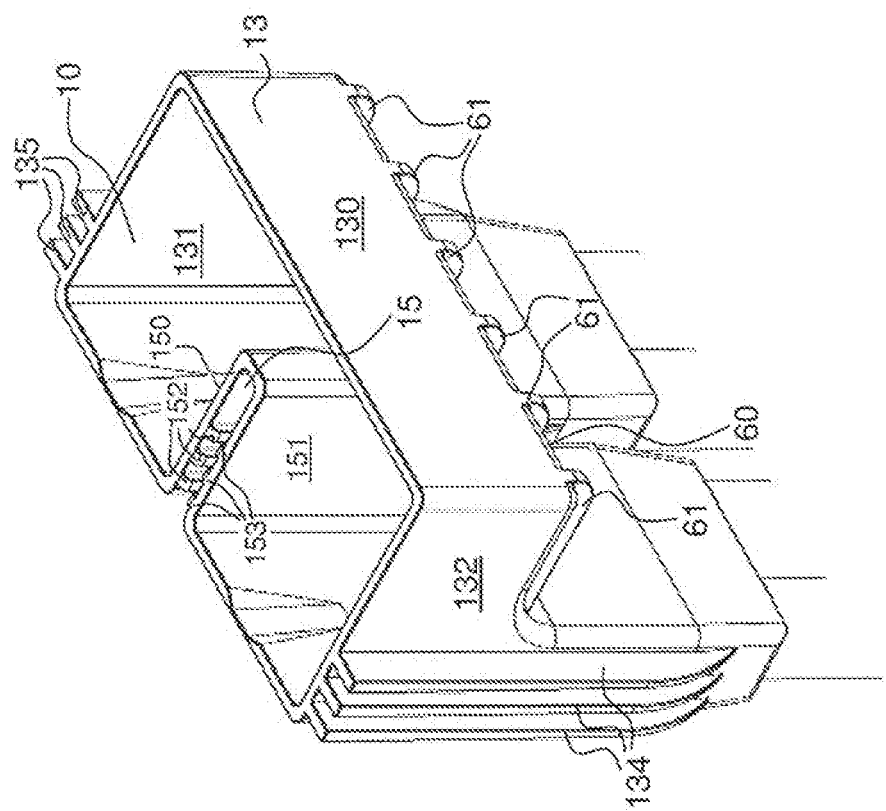
Figure 12:
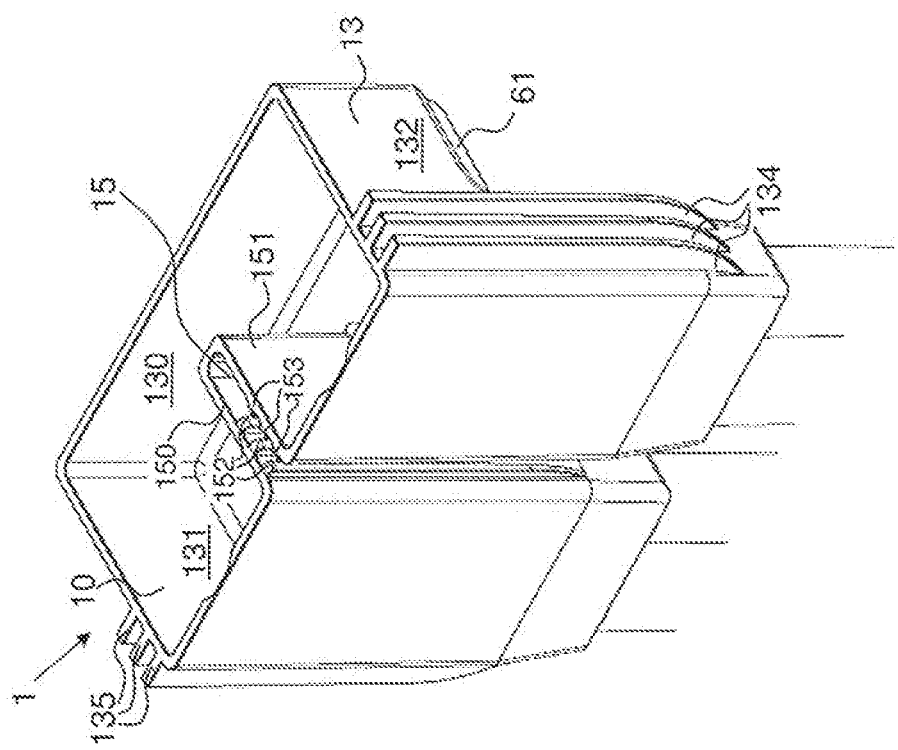
Figure 18:
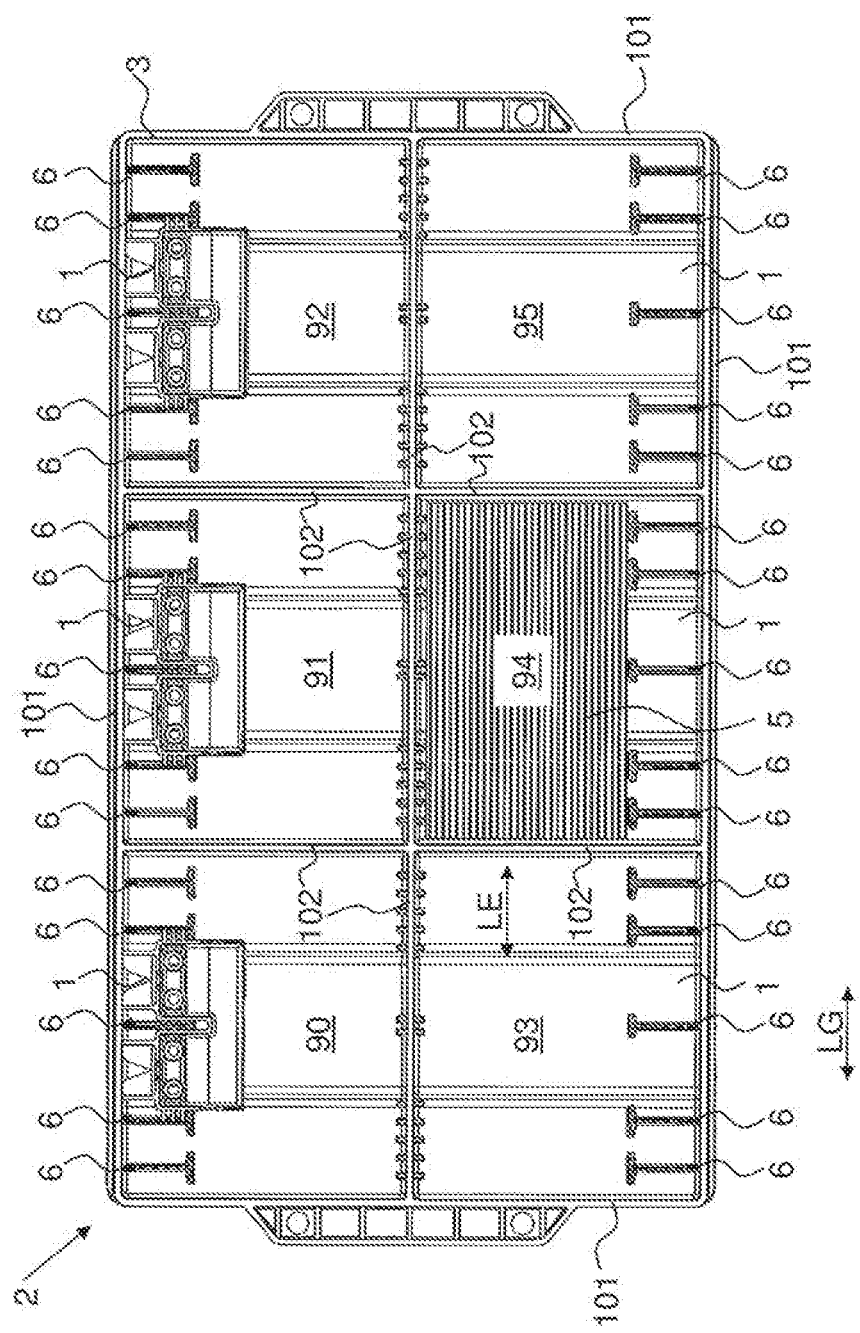

Shown are:

FIG. 1 a cross-sectional view of an accumulator with mixing element;

FIGS. 2 and 3 the accumulator according to FIG. 1 under motion load;

FIGS. 4-6 a first embodiment of a mixing element without external ribs;

FIGS. 7-9 a second embodiment of a mixing element without external ribs;

FIGS. 10-11 a third embodiment of a mixing element with external ribs;

FIGS. 12-13 a fourth embodiment of a mixing element with external ribs;

FIGS. 14-17 side sectional views of accumulators;

FIG. 18 a plan view of an accumulator from above; and

FIG. 19 stackable mixing elements.

The figures make use of the same reference numerals for equivalent elements. FIGS. 1 to 3 and 18 depict the accumulator without a cover part; i.e. in a state in which the accumulator's upper side is still open. To complete manufacture, the accumulator housing is normally closed in the usual way with a cover part.

FIG. 1 shows an accumulator 2 with a mixing element 1 arranged in its housing 3. Electrode plates 5 are additionally arranged in the housing 3, or in a cell chamber 4 of the housing respectively, which are partially enclosed by (not shown) separators. The housing 3 or cell chamber 4 additionally contains liquid electrolyte 7, wherein the electrolyte 7 is filled up to level 8. A housing rib 6 is further provided in the housing 3 or in cell chamber 4 respectively. The mixing element 1 is fixed to the housing rib 6, e.g. clamped to same.

As can be seen, the mixing element 1 comprises a volumetric space 13 at its upper end region which transitions downward into a thin flow channel 17 having a substantially smaller cross-sectional area compared to volumetric space 13. The flow channel 17 ends in one or more openings 11 in a lower region of the mixing element. The volumetric space 13 is likewise open upwardly; i.e. an opening 10 is provided therein. The upper and the lower openings 10, 11 enable the pressure between the interior of the mixing element 1 and the surrounding area of the accumulator housing 3 to be equalized at any time. An electrolyte level 9 is thus set in the mixing element 1 which corresponds to the electrolyte level 8 of the accumulator 2 and/or the respective cell chamber 4.

FIGS. 2 and 3 show the function of the mixing element 1 under accumulator 2 motion load. According to FIG. 2, the accumulator is tipped at an angle to the left. From the originally equally high levels 8, 9, the tilting first results in a level difference 12 since the electrolyte retained in the mixing element 1 can only flow out through the thin flow channel 17 at a decelerated rate. The arrows depict the outflow of electrolyte into the accumulator's cell chamber 4. It is now assumed that the equalizing process of the accumulator tilted to the left in FIG. 2 is finished so that the level 9 in the mixing element again corresponds to level 8. It is now assumed that the accumulator is then tilted for example somewhat to the right as depicted in FIG. 3. This again results in a level difference 12 between levels 8, 9, this time however in the reverse direction; i.e. level 9 being lower than level 8 as per FIG. 3. This results in electrolyte flowing back into the mixing element 1 through opening 11, as depicted by the arrows. The electrolyte is thus mixed and acid stratification thereby prevented or reduced. Advantageously, the mixing element 1 is thereby constructed tall enough relative to the wall height of the volumetric space 13 such that electrolyte is prevented from spilling over the upper edge of the mixing element 1 directly into the volumetric space 13 under normal motion load. When the accumulator is filled according to specification, such overspillage is allowed for up to a tilt angle of 20° relative to horizontal. A further embodiment allows for electrolyte overspillage up to a tilt angle of 35° relative to horizontal.

In regular operation; i.e. when the accumulator 2 is installed in a vehicle, the motion of the vehicle for example generates the motion load on the accumulator 2. Except for vehicle motion caused by road unevenness, longitudinal and lateral accelerations, e.g. when cornering, also result in the described accumulator 2 motion load.

FIGS. 4 to 6 show a first embodiment of the mixing element 1. FIG. 4 thereby shows an isometric view, FIG. 5 a rear view, and FIG. 6 a side view. As can be seen, the mixing element 1 comprises an indentation 15 which divides the volumetric space 13 into two sub-areas, albeit connected together over a relatively large cross section. The indentation 15 can serve in fitting the mixing element 1 onto the housing rib 6, as can be seen in FIGS. 1 and 16. The mixing element can simply be set onto the housing rib and wedged there by means of the indentation 15.

A floor 16 limits the volumetric space 13 in the downward direction. The volumetric space 13 has an open design upward by means of opening 10. In transition region 60 beneath floor 16, the volumetric space 13 transitions into a thin flow channel 17 which extends downward to opening 11. Because of the partitioning created by the indentation 15, the thin flow channel 17 is divided into two sub-channels 40, 50, each having a respective lower opening 11, 14. The openings 11, 14 can be configured as individual openings or as a combination of multiple openings. The mixing element can terminate in the area of the openings 11, 14 as a straight surface or, as visible in the figures, as a chamfer.

As further indicated in the drawings, the thin flow channel 17, or sub-channels 40, 50 respectively, have two linear discontinuities 41, 42, 51, 52 below transition 60. These discontinuities doubly reduce the circumference and thus also the inner cross-sectional area of the hollow body in the direction of the lower end region toward opening 11, 14.

FIGS. 7 to 9 show a second embodiment of the mixing element 1. FIG. 7 shows an isometric view, FIG. 8 a rear view, and FIG. 9 a side view. In contrast to the mixing element according to FIGS. 4 to 6, the mixing element 1 depicted here has in each case further divided sub-channels 43, 44, 53, 54, e.g. in the form of channels of circular cross section, in the lower regions of the flow channels 40, 50. Each of the sub-channels 43, 44, 53, 54 has its own circumference-reducing discontinuity 42, 52 as well as a lower opening 11, 14.

FIGS. 1 to 9 will be used to illustrate the basic function and design of the inventive mixing element by way of embodiments in which the mixing element does not comprise any securing and/or spacer ribs, referred to only as ribs in the following for short. FIGS. 10 to 19 will be used in the following in describing mixing elements comprising the respective external ribs.

FIGS. 10 and 11 show two different isometric views of a mixing element 1 corresponding to the mixing element according to FIGS. 7 to 9 and additionally comprising external ribs. Depicted in each case is only the respective upper area of the mixing element provided with the ribs; the sections underneath correspond to FIGS. 7 to 9. The mixing element embodiments comprising ribs described in the following can also, however, be of any other desired design with respect to the lower flow channels, e.g. as per FIGS. 4 to 6 or the like.

The mixing element 1 according to FIGS. 10 and 11 comprises an upward protruding rib 133 at the upper edge of the rear wall 30 of volumetric space 13, the ends of which can be angled toward the side wall regions 131, 132 of said volumetric space 13. The rib 133 extends in the direction of a housing cover of the accumulator housing so that the mixing element 1, when set into the housing, can be vertically fixed by the housing cover by way of the rib 133.

For the additional downward vertical fixing, ribs 61 are provided below at the lower side 60 of the volumetric space 13 which form a counter bearing to the upper rib 133 for fixing the mixing element 1 in an accumulator housing. The mixing element 1 can thus be clamped between the housing cover and the electrode plates, or their separators respectively, by means of the upper rib 133 and the downward-facing ribs 61 disposed at the bottom of the housing or an electrode plate pack of the accumulator respectively.

For the horizontal fixing and positioning, the mixing element comprises ribs 134, 135 on the respective side walls 131, 132 which protrude from the sides toward the side walls of the accumulator housing. Ribs 136, 137 are furthermore provided on the side of the volumetric space 13 opposite the rear wall 130 which are each arranged to form a V-shaped pair when the side of the volumetric space 13 to which they are fixed is viewed from above. To simplify the introduction of the mixing element 1 into the accumulator housing from above, the ribs 61, 134, 135, 136, 137 have a downward tapering and then rounded design.

Outward pointing ribs 152, 153 can be arranged within the indentation 15 on respective opposite walls 150, 151 of the volumetric space 13 by means of which the mixing element can be clamped to the housing rib 6.

The various ribs described with reference to FIGS. 10 and 11 do not always need to be realized fully in the mixing element or in the depicted dimensions. In fact, the ribs allow the mixing element to be adapted to other accumulator housing designs, for example by modifying the dimensions of the ribs or omitting individual ribs. An example of this is illustrated in the following referencing an alternative embodiment as depicted in FIGS. 12 and 13.

The mixing element 1 according to FIGS. 12 and 13 only comprises ribs 61, 134, 135, 152, 153. Ribs 61 are hereby configured at a shorter overall height than in FIGS. 10 and 11. The mixing element can thereby be installed for example into a housing of shorter overall height than the housing applicable to FIGS. 10 and 11. This is depicted in the following referencing FIGS. 14 to 17.

FIG. 14 and FIG. 17 respectively show a side view of an accumulator looking toward the rear wall 130 of the volumetric space 13 of the mixing element 1, FIGS. 15 and 16 respectively showing a view of side wall 131/132. FIGS. 14 and 15 hereby reflect the mixing element according to FIGS. 10 and 11; FIGS. 16 and 17, the mixing element according to FIGS. 12 and 13. The accumulator according to FIGS. 14 and 15 has a housing of larger overall height than the accumulator in FIGS. 16 and 17. It can be seen that the mixing element is in each case set onto a housing rib 6 and clamped between an electrode plate pack 5 and a housing cover 100 of the accumulator and thereby vertically fixed.

FIG. 18 shows a six-celled accumulator 2 in plan view, whereby the accumulator's housing cover has again not yet been positioned into place, thus visible being the six individual accumulator cells 90, 91, 92, 93, 94, 95 with the electrode plates 5 arranged therein. An electrode plate group 5 is only depicted in cell chamber 94 by way of example. It can be seen that as far as their greatest dimension LE, the electrode plates 5 extend in the same direction as the greatest dimension LG of the housing 3 of the accumulator 2. It can further be seen that the housing 3 comprises housing ribs 6. A mixing element 1 fit onto a housing rib 6 is exemplarily depicted in each cell chamber 90, 91, 92, 93, 94, 95. The housing 3 of the accumulator 2 thereby has external side walls 101 and internal walls 102. The internal walls 102 divide the interior of the housing 3 into cell chambers for the accumulator cells 90, 91, 92, 93, 94, 95.

FIG. 19 shows an example stackable design of the mixing elements 1 into one another using the mixing elements of FIGS. 10 and 11 (left) and FIGS. 12 and 13 (right). Such a design can thereby save space and simplify automated assembly of mixing elements.

The invention claimed is:

1. A mixing element designed to be installed into a housing of an electrochemical accumulator operated by means of liquid electrolyte in order to mix the electrolyte as a result of forces and/or motion exerted on the accumulator during operation, wherein the mixing element is designed as a hollow body provided with at least one respective opening at opposite end regions such that a channel is formed in the hollow body which leads into the at least one respective opening in the opposite end regions and is circumferentially delimited by the material of the mixing element, wherein the mixing element comprises a volumetric space in the area of an upper end region designed to be arranged above an oppositely disposed lower end region when installed in the housing, the circumference of which is significantly larger than the circumference of the sections of the mixing element below it so that the sections of the mixing element underneath form at least one thin flow channel compared to the cross-sectional area of the volumetric body, wherein the at least one thin flow channel has at least two further divided sub-channels, each of the sub-channels having a lower opening, wherein each of the sub-channels has its own circumference-reducing discontinuity, the circumference-reducing discontinuity of each sub-channel dividing the respective sub-channel in an upper portion and an opposite lower portion, wherein the lower portion of each of the sub-channels terminates in the area of its lower opening as a straight surface or as a chamfer, and wherein a cross-sectional area of the upper portion of each sub-channel is larger than a cross-sectional area of the lower portion of the respective sub-channel.

2. The mixing element according to claim 1, wherein the circumference of the hollow body in the area of the at least one thin flow channel decreases toward the lower end region below a transition from volumetric space into the at least one flow channel.

3. The mixing element according to claim 1, wherein the mixing element is designed as a hollow body produced in an injection molding process with an internal mandrel and an external form, in a blow process or in a deep-drawing process.

4. The mixing element according to claim 1, wherein the mixing element comprises one or more securing and/or spacer ribs protruding from the external side of the mixing element and designed to contact parts of the housing of the accumulator in order to fix the mixing element in the accumulator and/or set a specific position of the mixing element relative to the parts of the housing.

5. The mixing element according to claim 4, wherein at least one securing and/or spacer rib of the one or more securing and/or spacer ribs protrudes toward a housing cover of the housing of the accumulator.

6. The mixing element according to claim 4, wherein at least one securing and/or spacer rib of the one or more securing and/or spacer ribs protrudes toward a housing bottom of the housing of the accumulator.

7. The mixing element according to claim 4, wherein the one or more securing and/or spacer ribs are arranged on the outer circumference of one, some or all of their external sides facing side walls of the housing of the accumulator.

8. The mixing element according to claim 4, wherein the one or more securing and/or spacer ribs are arranged within an indentation.

9. The mixing element according to claim 8, wherein the one or more securing and/or spacer ribs are arranged on oppositely disposed external sides of the mixing element within the indentation.

10. The mixing element according to claim 4, wherein at least two securing and/or spacer ribs of the one or more securing and/or spacer ribs are arranged relative each other so as to form a V-shaped pair.

11. An accumulator having a housing in which at least one accumulator cell is formed, wherein the accumulator cell comprises a plurality of plated-shaped electrodes arranged adjacently within said accumulator cell as well as liquid electrolyte, wherein at least one mixing element in accordance with claim 1 is additionally arranged in a free space within said accumulator cell.

12. The accumulator according to claim 11, wherein the mixing element extends at least as far upward so as to prevent liquid electrolyte from overflowing over the upper edge region of the mixing element upon specification-compliant motion load on the accumulator, wherein the specification-compliant motion load on the accumulator corresponds to a substantially horizontal position in which a cover of the accumulator as well as its filler openings for the liquid electrolyte are situated at the top.

* * * * *

UNITED STATES PATENT AND TRADEMARK OFFICE
CERTIFICATE OF CORRECTION

PATENT NO. : 10,886,571 B2  
APPLICATION NO. : 15/036974  
DATED : January 5, 2021  
INVENTOR(S) : Schwab et al.

Page 1 of 1

It is certified that error appears in the above-identified patent and that said Letters Patent is hereby corrected as shown below:

In the Specification

1. In Column 5, Lines 46-47, delete "plated-shaped" and insert -- plate-shaped --, therefor.

2. In Column 8, Line 27, delete "rear wall 30" and insert -- rear wall 130 --, therefor.

In the Claims

3. In Column 10, Line 45, in Claim 10, delete "relative each" and insert -- relative to each --, therefor.

4. In Column 10, Line 49, in Claim 11, delete "plated-shaped" and insert -- plate-shaped --, therefor.

Signed and Sealed this  
Eighteenth Day of January, 2022

Drew Hirshfeld  
*Performing the Functions and Duties of the  
Under Secretary of Commerce for Intellectual Property and  
Director of the United States Patent and Trademark Office*